United States Patent
Nübling et al.

(10) Patent No.: US 9,111,158 B2
(45) Date of Patent: Aug. 18, 2015

(54) ILLUMINATION APPARATUS FOR A CAMERA-BASED CODE READER

(75) Inventors: Ralf Ulrich Nübling, Denzlingen (DE); Roland Gehring, Elzach (DE); Richard Nopper, Gutach (DE)

(73) Assignee: SICK AG, Waldkirch (DE)

(*) Notice: Subject to any disclaimer, the term of this patent is extended or adjusted under 35 U.S.C. 154(b) by 323 days.

(21) Appl. No.: 13/443,984

(22) Filed: Apr. 11, 2012

(65) Prior Publication Data
US 2012/0261472 A1   Oct. 18, 2012

(30) Foreign Application Priority Data
Apr. 15, 2011   (EP) .................................... 11162584

(51) Int. Cl.
*G06K 7/10* (2006.01)

(52) U.S. Cl.
CPC ........ *G06K 7/10722* (2013.01); *G06K 7/10732* (2013.01); *G03B 2215/0575* (2013.01)

(58) Field of Classification Search
CPC .......... G06K 7/10574; G06K 7/10584; G06K 7/10603; G06K 7/10732; G06K 7/10801; G06K 7/10811; G06K 7/10831; G06K 9/3208
See application file for complete search history.

(56) References Cited

U.S. PATENT DOCUMENTS

| | | | | |
|---|---|---|---|---|
| 3,935,580 A * | 1/1976 | Klainos | .......................... | 396/336 |
| 4,115,701 A * | 9/1978 | Guichard | ........................ | 250/552 |
| 4,500,180 A * | 2/1985 | Stevens | .......................... | 351/234 |
| 5,770,848 A * | 6/1998 | Oizumi et al. | ........... | 235/462.14 |
| 6,726,105 B2 * | 4/2004 | Patel et al. | ................ | 235/462.45 |
| 6,967,710 B2 * | 11/2005 | Shiraishi | ........................... | 355/67 |
| 7,264,162 B2 * | 9/2007 | Barkan | ........................... | 235/454 |
| 7,970,269 B2 * | 6/2011 | Nubling et al. | .................. | 396/61 |
| 2002/0191307 A1 * | 12/2002 | Nakamura | ...................... | 359/698 |
| 2005/0063049 A1 * | 3/2005 | Steenblik et al. | .............. | 359/368 |
| 2005/0199720 A1 * | 9/2005 | Barkan | ........................... | 235/454 |
| 2005/0231948 A1 * | 10/2005 | Pohlert et al. | .................. | 362/237 |
| 2006/0202038 A1 * | 9/2006 | Wang et al. | ............... | 235/462.24 |
| 2007/0148807 A1 * | 6/2007 | Akram | .............................. | 438/65 |
| 2007/0170350 A1 * | 7/2007 | Farnworth et al. | .......... | 250/208.1 |
| 2007/0272827 A1 * | 11/2007 | Heo et al. | .................... | 250/208.1 |

(Continued)

FOREIGN PATENT DOCUMENTS

EP   2 136 248 A1   12/2009

OTHER PUBLICATIONS

European Search Report issued on Aug. 10, 2011, in counterpart European Patent Application 11162584.4.

*Primary Examiner* — Daniel Walsh
(74) *Attorney, Agent, or Firm* — Nath, Goldberg & Meyer; Jerlad L. Meyer

(57) ABSTRACT

An illumination apparatus (10) is provided for a camera-based code reader (100) having a plurality of light transmitters (16) arranged in ring shape and in a fixed position with respect to a base housing part (12) and having a plurality of optical transmission systems (20) associated with the light transmitters (20) in a front housing (14) supported rotationally movably with respect to the base housing part (12), wherein the optical transmission systems (20) can be set to adapt the illumination by rotation of the front housing (14). The front housing (14) has a plurality of front lenses (20) and the front housing (14) is supported in a thread (15) with respect to the base housing part (12) so that front lenses (20) can be associated with the light transmitters (16) at a changed spacing by a rotational movement of the front housing (14).

17 Claims, 2 Drawing Sheets

(56) References Cited

U.S. PATENT DOCUMENTS

Figure 1:
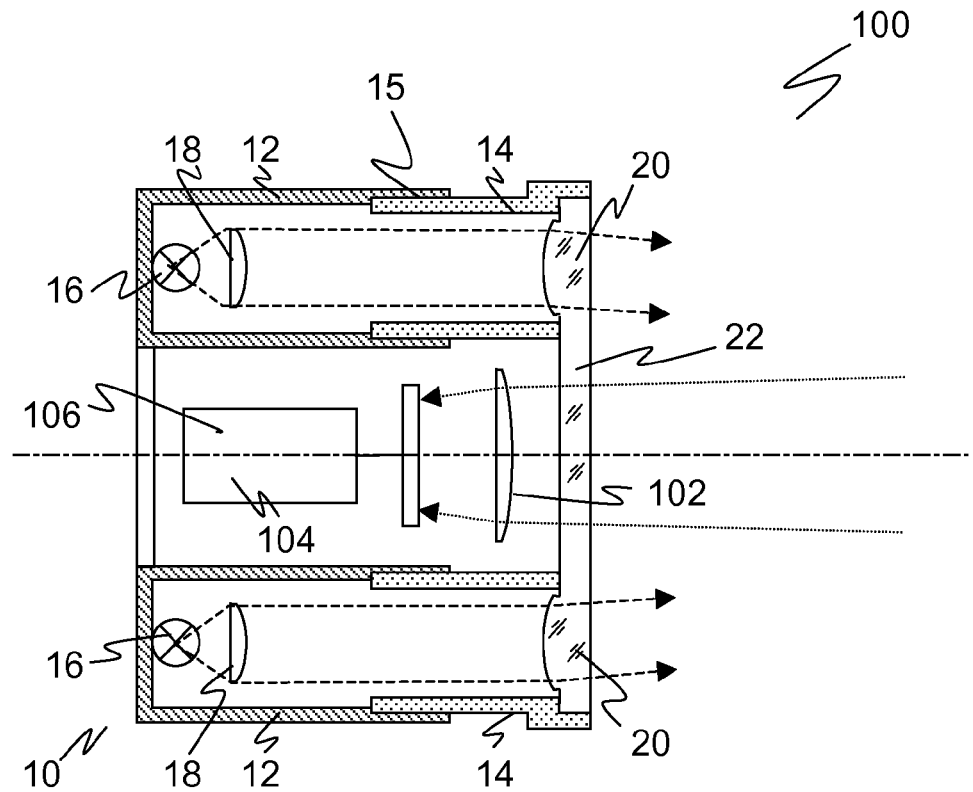

| | | | |
|---|---|---|---|
| 2008/0278621 A1* | 11/2008 | Cho et al. | 348/374 |
| 2010/0021151 A1* | 1/2010 | Nubling et al. | 396/61 |
| 2010/0270469 A1* | 10/2010 | Johnson et al. | 250/330 |
| 2012/0261472 A1* | 10/2012 | Nubling et al. | 235/454 |
| 2013/0242396 A1* | 9/2013 | Ishihara | 359/601 |
| 2013/0284808 A1* | 10/2013 | Nubling | 235/455 |

\* cited by examiner

ILLUMINATION APPARATUS FOR A CAMERA-BASED CODE READER

The invention relates to an illumination apparatus for a camera-based code reader and to a method for the illumination of a detection zone matched to a working distance.

Camera-based code readers are increasingly being used for reading optical codes such as barcodes or matrix codes. In this process, an image of the code is taken and the code information is subsequently read out using digital image processing. In this respect, in industrial applications, the code reader is frequently mounted in a stationary manner at a conveyor belt on which objects bearing a code are conveyed past the code reader. Handheld devices are also known which are guided over the codes to be read.

Many cameras have their own illumination so that the reading field is sufficiently illuminated. Common LED illumination systems are usually diffuse and are thus not matched to object distances and can also not be adjusted to the camera. In this respect, only the direct radiation characteristic of the LEDs is often used; in other cases, a lens is utilized for light bundling and to increase efficiency. Such known LED illuminations have high radiation intensities in the near zone which then fall rapidly at larger distances. In addition, the light distribution is also inhomogeneous within the illumination field and shows a high fall-off at the margins.

An image taking apparatus having an adaptable illumination from a plurality of light sources is known from EP 2 136 248 A1. In an embodiment, three beam-shaping groups of optical systems are arranged alternately in a circular path about an optical reception system for the object illumination. The beam-shaping group of optical systems suitable for a respectively used optical reception system can be selected from these beam-shaping groups of optical systems by rotating the objective illumination in that said beam-shaping group of optical systems is brought into alignment with the light sources. It is disadvantageous in this arrangement that different beam-shaping groups of optical systems have to be provided even through only a respective one of them is used and that the number of illumination scenarios that are possible is restricted to the number of as beam-shaping groups of optical systems that are present. Particularly with a tight population of the circular path with light sources, the provision of different beam-shaping groups of optical systems not only means a higher complexity and cost, bus is also only possible within very tight limits due to the available space.

It is therefore the object of the invention to provide a simple illumination which can be set to a detection zone.

This object is satisfied by an illumination apparatus for a camera-based code reader and by a method for the illumination of a detection zone matched to a working distance as set forth in the independent claims. In this respect, the invention starts from the basic idea of equipping optical transmission systems with a plurality of light transmitters arranged in a ring (at least two light transmitters), the light transmitters each having a movable component replaceable by its movement. This replacement takes place in that the movable portion of the optical transmission system is associated with a different light transmitter by a rotational movement of a front housing. The rotational movement in this respect simultaneously provides a distance change of the front housing with respect to a base housing part in which the light transmitters are located. This effectively results in a distance change in each of the optical transmission systems and thus in an adjustment of the illumination to a different working distance or in a change of the illumination field.

The invention has the advantage that the illumination can be set to different distances and illumination scenarios with a very simple and thus inexpensive design. For this purpose, only the front housing has to be rotated into a suitable position. The optical elements themselves can in this respect be very simple lenses. A good adaptability to different applications is nevertheless achieved. The illumination field can be delineated well in accordance with the field of view of the camera and can be uniformly illuminated. A high intensity of illumination is also achieved at larger distances.

A respective transmission lens of fixed position with respect to the light transmitters is preferably associated with each of the light transmitters. The optical transmission systems thus each include a transmitting lens of fixed position whose association with a light transmitter is independent of the rotational position of the front housing and a moving front lens replaced by a rotational movement of the front housing. More powerful optical transmission systems with smaller aberrations can be set up by the additional transmission lenses.

The front lenses are preferably all of the same type among one another and/or the transmission lenses are preferably all of the same type among one another. They therefore have the identical optical parameters among one another such as focal length, curvature and material and are thus optically equivalent. The lenses are, for example, produced with the same process or from the same master for this purpose. The manufacture of the illumination apparatus thereby becomes particularly inexpensive. In addition, the optical transmission systems are independent of the specific rotational position of the front housing and are thus optically equivalent to the association between the front lenses and the transmission lenses among one another.

The light transmitters, the front lenses and/or the transmission lenses are preferably arranged uniformly distributed in the peripheral direction. The transmission lenses are also automatically arranged uniformly with a uniform arrangement of the light transmitters due to their fixed-position association. The front lenses first form a group independent of the light transmitters, even if they can be advantageously matched to the light transmitters in arrangement and number. A rotationally symmetrical, particularly homogeneous illumination arises due to the uniform arrangement.

The plurality of light transmitters, front lenses and transmission lenses is preferably the same in each case. This is again already induced for the light transmitters and the transmission lenses by the fixed-position association. The front lenses can, however, in principle deviate therefrom both in arrangement and in order. A selection of front lenses is then made by the rotation of the front housing, each front lens forming an optical transmission system with a transmission lens in the respective rotary position. If however, a number of front lenses equal to the number of transmission lenses is selected, in particular in an identical uniform arrangement, a suitable rotational movement of the front housing will displace each front lens by a respective further position to the next adjacent transmission lens, so that the existing lenses are ideally utilized.

The thread is preferably formed with detents so that the base housing part and the front housing latch at specific adjustment angles with respect to one another. These adjustment angles advantageously correspond precisely to the rotational positions in which the next front lenses come into alignment with the transmission lenses. No fine positioning has to be carried out due to the detents since the exact rotational position is automatically adopted and maintained.

The detent locations are preferably spaced apart from one another at the same angular interval as the front lenses or at a multiple thereof. A very small detent interval is thus predefined which corresponds to the finest meaningful adjustment at which the front lens first associated with a given transmission lens is replaced by a next adjacent front lens. How much the optical transmission systems are adjusted on rotation by one detent depends on the thread pitch and on the space change thereby induced between the front lenses and the transmission lenses.

The front housing preferably includes a front screen of the illumination apparatus and/or of the camera-based code reader. The illumination apparatus or the code reader is thus protected from external influences.

The front lenses are preferably integrated into the front screen. The front lenses can thereby be manufactured particularly inexpensively. Only a special molded part has to be used for the front screen. The front lenses are then integrated into the illumination practically without any additional effort due to the dual function of the front screen.

The front housing preferably has a grip surface for manual rotation or is connected to a drive for a powered rotation. The rotational movement of the front housing required for an adjustment of the illumination can thus take place.

In a preferred further development of the invention, a camera-based code reader includes an illumination apparatus in accordance with the invention and additionally has an image sensor and an evaluation unit which is designed to read out and output code information of an imaged code from image data of the image sensor. The codes are thus illuminated uniformly and sufficiently even under unfavorable environmental conditions and can therefore be detected with particularly small reading errors.

The method in accordance with the invention can be further developed in a similar manner and shows similar advantages in so doing. Such advantageous features are described in an exemplary, but not exclusive manner in the subordinate claims dependent on the independent claims.

Figure 2:
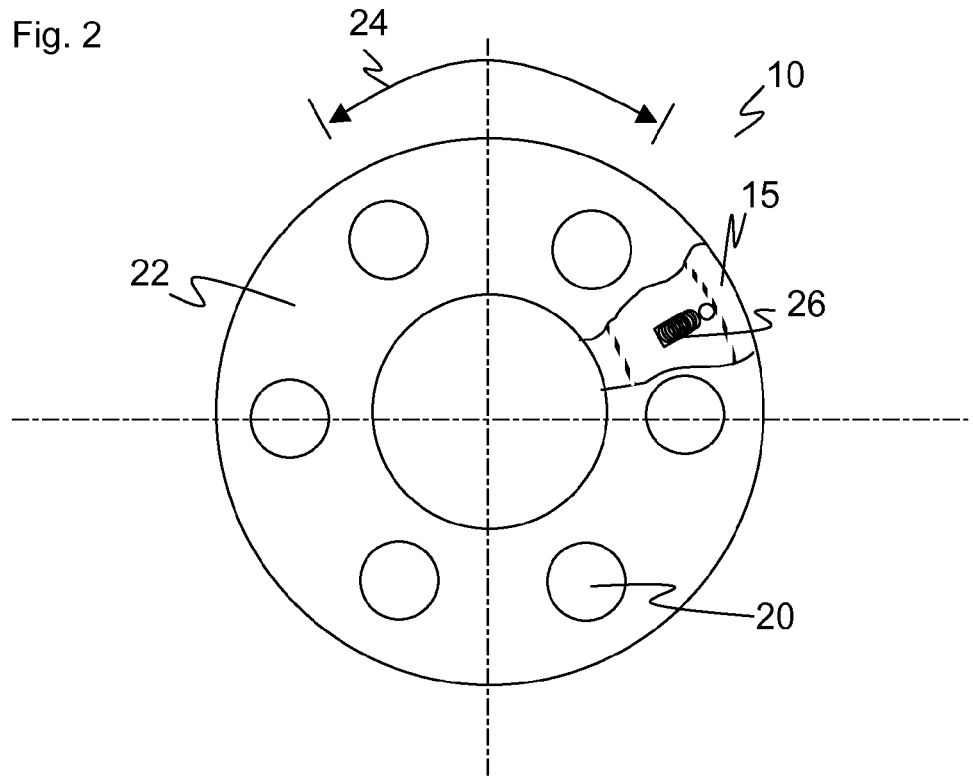
Figure 3A:
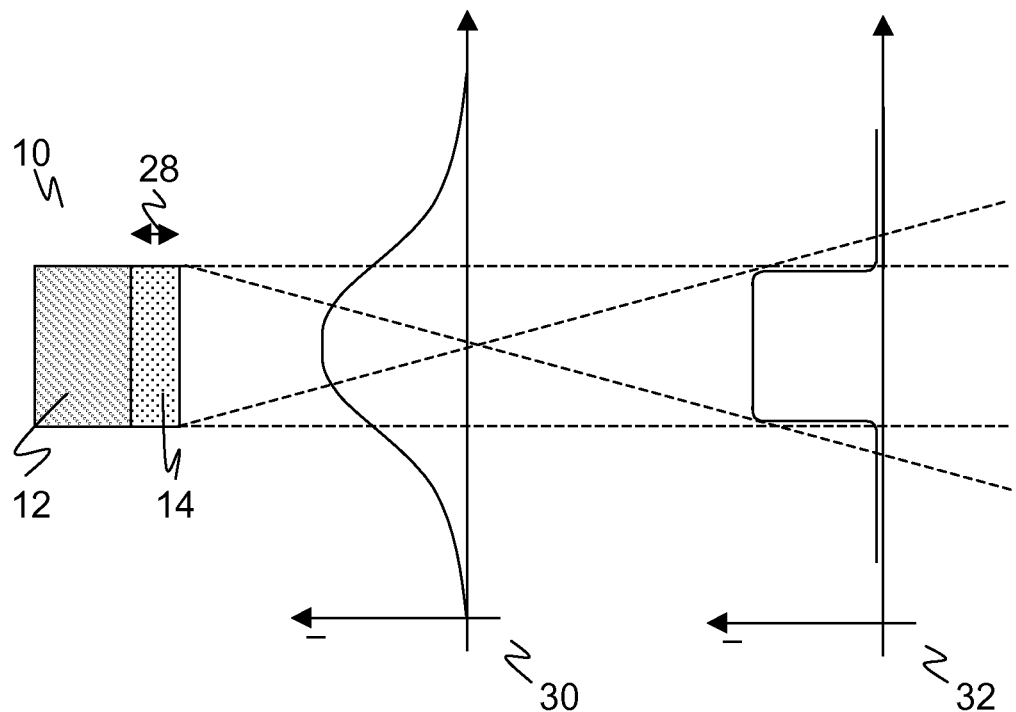
Figure 3B:
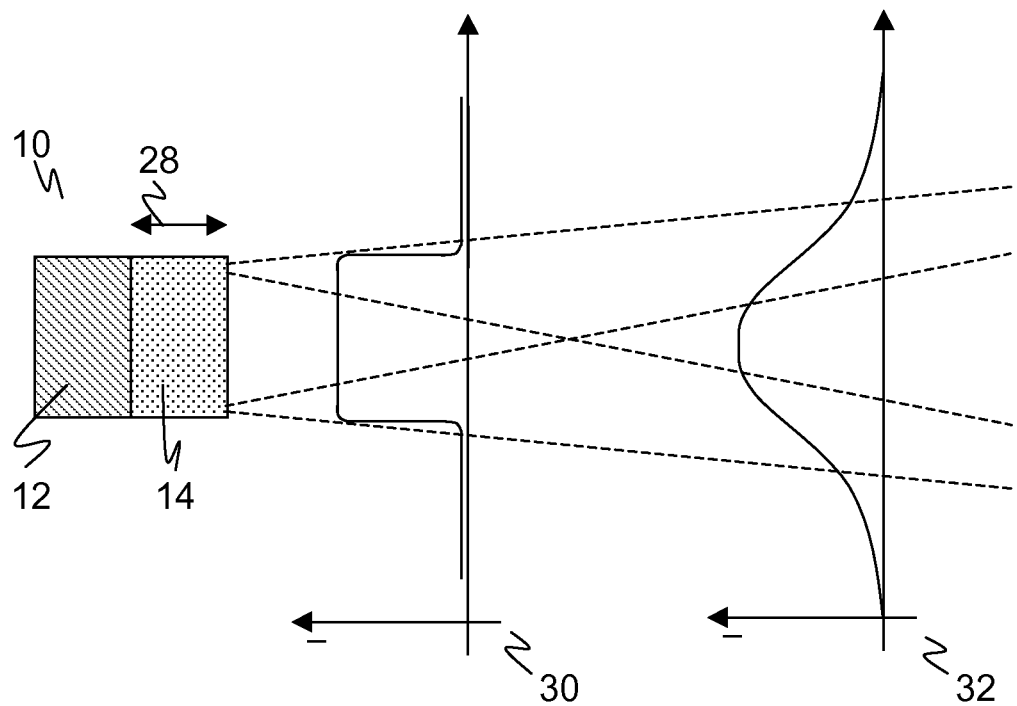

The invention will be explained in more detail in the following also with respect to further features and advantages by way of example with reference to embodiments and to the enclosed drawing. The Figures of the drawing show in:

FIG. 1 a sectional representation by a camera-based code reader with an illumination apparatus in accordance with the invention;

FIG. 2 a front view of the illumination apparatus in accordance with FIG. 1;

FIG. 3a a sketched representation of the intensity distribution in the illumination fields with an illumination apparatus focused at far; and FIG. 3b a sketched representation in accordance with FIG. 3a with an illumination apparatus focused at near.

FIG. 1 shows a sectional representation of a camera-based code reader 100. A ring-shaped illumination apparatus 10 of the code reader 100 is again shown in a front view in FIG. 2. The same reference numerals in all Figures designate the same features. The invention will be described for the example of a camera-based code reader 100. The illumination apparatus 10 in accordance with the invention can, however, equally be used for other cameras with their own illumination.

The code reader 100 has an optical reception system 102 to image a code, not shown, sharply on an image sensor 104. Image data of the codes are then supplied to an evaluation unit 106 which reads out the code information. The design of the reception path of the code reader 100 is known per se and only its most important elements are therefore also shown. Differing from the representation, the center region of the code reader 100 in which the image sensor 104 and the evaluation unit 106 are located, can also be taken up entirely by a reception objective and the further elements of the reception path are arranged downstream of this reception objective, that is to the left of the representation in FIG. 1.

The illumination apparatus 10 has a base housing part 12 and a front housing 14 which are in threaded engagement with one another via a thread 15. The front housing 14 is accordingly rotatable with respect to the base housing part 12 and the spacing between the base housing part 12 and the front housing 14 varies in dependence on the angle of rotation and the thread pitch. In this respect, any mechanical connections which effect a space variation on a rotational movement are to be understood under the term thread.

A plurality of light transmitters 16, for example two to ten or even more light transmitters, are arranged in ring in the base housing part 12. LEDs, for example, serve as light sources of the light transmitters 16. A transmission lens 18 is respectively associated with the light transmitters 16 in a fixed position.

The front housing 14 has a plurality of front lenses 20. In the embodiment shown in FIG. 1, these front lenses 20 are integrated into a front screen 22 of the code reader 100. Alternative embodiments provide separate front lenses 20 which are accommodated in the front housing 14, protected by a front screen 22, for example.

A respective pair of a transmission lens 18 and a front lens 20 forms an optical transmission system for a light transmitter 16. The transmission lenses 18 can be dispensed with in a particularly simple embodiment. Conversely, more complicated optical transmission devices with further lenses or other additional optical elements can also be provided.

On a rotational movement of the front housing 14 with respect to the base housing part 12, the association between the light transmitters 16 with their transmission lenses 18, on the one hand, and the front lenses 20, on the other hand, is varied. As can best be recognized in FIG. 2 the next adjacent front lens 20 moves into position at an angle of adjustment 24 which corresponds to the angular spacing of two front lenses 20. The optical transmission system associated with a light transmitter 16 is thus formed, after a corresponding rotational movement of the front housing 14, by another pair from the fixed-position transmission lens 18 and the front lens 20 newly moved in front of the light transmitter 16. Since, on the rotation, the spacing between the front housing 14 and the base housing part 12 varies due to the thread 15, this also results in a changed spacing between the transmission lens 18 and the front lens 20 and thus in changed optical properties of the optical transmission system. The associations of the front lenses 20 to the transmission lenses 18 are varied again by a continued rotational movement to achieve greater spacing changes. The front lenses 20 thus form variable optical elements with whose aid the illumination apparatus 10 is focused on a desired distance and/or a change of the illuminated field is effected.

On a free rotational movement of the front housing 14, the angular setting would in each case have to be selected and fixed very exactly to bring the front lens 20 into the right arrangement with respect to the transmission lens 18 and to hold it firmly there. The thread 15 is therefore preferably provided with a detent arrangement between the base housing part 12 and the front housing 14. The front screen 22 is shown broken away at one point in FIG. 2 to illustrate a spring-supported ball cylinder pin 26 having a correspondingly oppositely disposed opening as an implementation example of a detent arrangement. The front housing 14 thus latches into the positions which are predefined by the openings and which are distributed so that a respective front lens 20 is in each case in the desired position with respect to the light transmitter 16 or to its transmission lens 18 associated in a fixed position. For this purpose, the detent points are spaced apart, for example, at the adjustment angle 24 which lies between two front lenses 20.

FIG. 2 shows the front lenses 20 in a preferred uniform distribution over the periphery with the same radial spacing. Different radial spacings are also conceivable, for example to form a plurality of mutually offset rings. The light transmitters 16 and with them the transmission lenses 18 arranged in a fixed position thereto, are arranged in an analog manner to form one or more rings. In this respect, however, the number of light transmitters 16 with their transmission lenses 18, on the one hand, and the number of front lenses 20, on the other hand, does not necessarily have to be the same. For example, four light transmitters 16 can also be present with 6, eight or even more front lenses 20. Some of the front lenses 20 are then inactive in each rotational position. Smaller angular steps than the angular spacing of two light transmitters 16 are sufficient for this purpose to form new optical transmission systems. In an extreme case, it is also possible only to imagine one light transmitter 16 with only one front lens 20 which is then again in front of the light transmitter 16 at a new spacing after each one complete rotation of the front housing. High luminous intensities and a simple adjustment possibility are, however, achieved with a plurality of light transmitters 16 and a number of front lenses 20 which is at least just as large. The setting characteristic can also be influenced, in addition to via the number of front lenses 20 and via the detent points, via the thread pitch of the thread 15 which fixes the spacing change of the front lens 20 at a given adjustment angle.

FIG. 3 shows a sketched representation of the illumination field produced by the illumination apparatus 10. In this respect, the illumination apparatus 10 is set for a far illumination field in FIG. 3a in that the front housing 14 is screwed in a lot. The spacing of the front housing 14 from the base housing part 12 and thus also the spacing between the front lenses 20 and the transmission lenses 18 are particularly small as is indicated by an arrow 28. In FIG. 3b, in contrast, the illumination apparatus 10 is set for a near illumination field in that the front housing 14 is screwed outwardly to a large degree. The spacing of the front housing 14 from the base housing part 12 and thus also the spacing between the front lenses 20 and the transmission lenses 18 are particularly large.

Respective schematic intensity curves are drawn with reference numerals 30 and 32 in a section in the near zone and in the far zone respectively. If as in FIG. 3a, the illumination apparatus is focused on a far illumination field, a more smeared intensity curve 30 is formed in the near zone; in the far zone, in contrast, a homogeneous and relatively sharply delineated intensity curve 32 is formed. If conversely, as in FIG. 3b, the illumination apparatus 10 is set on a near illuminated field, a homogeneous and relatively sharply delineated intensity curve 30 is formed in the near zone and a more diffuse and more inhomogeneous intensity curve 32 is formed with an increasing distance in the far zone. The illumination apparatus 10 can thus be set to the desired working distance and a desired illumination field can be set by a manual or powered rotation of the front housing 14.

The invention claimed is:

1. An illumination apparatus (10) for a camera-based optical code reader (100) having a base housing part (12), a front housing (14), a thread supporting the front housing for rotational movement with respect to the base housing part (12), a plurality of light transmitters (16) arranged in a ring and in a fixed position with respect to the base housing part (12) and a plurality of optical transmission systems (20) in the front housing (14) and associated with the light transmitters (16), wherein the optical transmission systems (20) can be set for an illumination focused on a working distance or for a change of the illumination field by rotation of the front housing(14), wherein the front housing (14) has a plurality of front lenses (20) forming part of said optical transmission systems, whereby the front lenses (20) can be associated with the light transmitters (16) at a changed spacing from the front lenses to the light transmitters along an optical axis by a rotational movement of the front housing(14);
wherein the illumination apparatus is part of the optical code reader and illuminates the optical code read by the optical code reader.

2. An illumination apparatus (10) in accordance with claim 1, wherein a respective transmission lens (18) is associated with each of the light transmitters (16) and the transmission lenses are in a fixed position with respect to the light transmitters (16).

3. An illumination apparatus (10) in accordance with claim 1, wherein the front lenses (20) all have identical focal length.

4. An illumination apparatus (10) in accordance with claim 1, wherein the transmission lenses (18) are all of the same type.

5. An illumination apparatus (10) in accordance with claim 1, wherein the base housing part (12) and the front housing (14) have a peripheral direction and the light transmitters (16), the front lenses (20) and the transmission lenses (18) are arranged uniformly distributed in the peripheral direction.

6. An illumination apparatus (10) in accordance with claim 1, wherein the number of light transmitters (16), the number of front lenses (20) and the number of transmission lenses (18) is the same.

7. An illumination apparatus (10) in accordance with claim 1, wherein the thread (15) is formed with detents so that the base housing part (12) and the front housing (14) latch at specific adjustment angles to one another.

8. An illumination apparatus (10) in accordance with claim 7, wherein the front lenses (20) have an angular spacing and the detents (26) are spaced apart from one another at the angular spacing (24) of the front lenses (20) or at a multiple thereof.

9. An illumination apparatus (10) in accordance with claim 1, wherein the front housing (14) has a front screen (22) for at least one of the illumination apparatus (10) and the camera-based code reader (100).

10. An illumination apparatus (10) in accordance with claim 9, wherein the front lenses (20) are integrated into the front screen (22).

11. An illumination apparatus (10) in accordance with claim 1, wherein the front housing (14) has a grip surface for manual rotation.

12. An illumination apparatus (10) in accordance with claim 1, wherein the front housing is connected to a drive for a powered rotation.

13. A camera-based optical code reader (100) including an illumination apparatus (10) having a base housing part (12), a front housing (14), a thread supporting the front housing for rotational movement with respect to the base housing part (12), a plurality of light transmitters (16) arranged in a ring and in a fixed position with respect to the base housing part (12) and a plurality of optical transmission systems (20) in the front housing (14) and associated with the light transmitters (16), wherein the optical transmission systems (20) can be set for an illumination focused on a working distance or for a change of the illumination field by rotation of the front housing (14) and wherein the front housing (14) has a plurality of front lenses (20) forming part of said optical transmission systems, whereby the front lenses (20) can be associated with the light transmitters (16) at a changed spacing from the front lenses to the light transmitters along an optical axis by a rotational movement of the front housing (14), the camera based code reader further including an image sensor (104) adapted to produce image data and an evaluation unit (106) which is designed to read out and output code information of an imaged optical code from the image data produced by the image sensor (104);

corresponding to the optical code illuminated by the illumination apparatus of the optical code reader.

14. A method for the illumination of a detection zone corresponding to an optical code matched to a working distance of an camera-based optical code reading apparatus having a base housing part (12), a front housing (14), a thread supporting the front housing for rotational movement with respect to the base housing part (12), a plurality of light transmitters (16) arranged in a ring and in a fixed position with respect to the base housing part (12) and a plurality of optical transmission systems (20) in the front housing (14) and associated with the light transmitters (16), wherein the front housing (14) has a plurality of front lenses (20) forming part of said optical transmission systems, the method comprising the steps of:

illuminating the detection zone by the plurality of light transmitters (16) arranged in ring and in a fixed position with respect to the base housing part (12), matching the radiation characteristics of the light transmitters (16) to the working distance by setting the position of at least elements of the optical transmission systems (20) and rotating the front housing (14) with respect to the base housing part (12) to adjust a spacing between the base housing part (12) and the front housing (14) and thus simultaneously a changed spacing between the respective light transmitters (16) arranged in the base housing part (12) and the front lenses (20) arranged in the front housing (14) along an optical axis;

wherein the illuminating enables the camera-based optical code reading apparatus to produce image data and read out code information obtained by the camera-based optical code reading apparatus from the optical code being illuminated.

15. A method in accordance with claim 14, wherein the front lenses (20) have an angular spacing, the method comprising the further step of latching the thread (15) at adjustment angles which correspond to the angular spacing (24) of the front lenses (20) or to a multiple thereof.

16. A method in accordance with claim 15, wherein the optical transmission system (20) is adjusted by rotating the front housing into a different latched adjustment angle thereby varying a spacing of the light transmitters (16) from a spacing associated with a previous latched adjustment angle.

17. A method in accordance with claim 14, wherein respective fixed-position transmission lenses (18) are each associated with one of the light transmitters (16); and wherein the optical transmission systems (18, 20) each formed by a respective transmission lens (18) and a front lens (20) are adjusted in that respective different front lenses (20) are arranged at a different distance from the transmission lenses (18) by a rotational movement of the front housing (14).

* * * * *